(12) United States Patent
Cheverton et al.

(10) Patent No.: US 9,925,715 B2
(45) Date of Patent: Mar. 27, 2018

(54) SYSTEMS AND METHODS FOR MONITORING A MELT POOL USING A DEDICATED SCANNING DEVICE

(71) Applicant: General Electric Company, Schenectady, NY (US)

(72) Inventors: Mark Allen Cheverton, Mechanicville, NY (US); John Broddus Deaton, Jr., Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 734 days.

(21) Appl. No.: 14/319,189

(22) Filed: Jun. 30, 2014

(65) Prior Publication Data

US 2015/0375456 A1 Dec. 31, 2015

(51) Int. Cl.
| | | |
|---|---|---|
| *B29C 67/00* | (2017.01) | |
| *B29C 64/268* | (2017.01) | |
| *B33Y 50/02* | (2015.01) | |
| *B33Y 30/00* | (2015.01) | |
| *B33Y 10/00* | (2015.01) | |
| *B29C 64/393* | (2017.01) | |
| *B23K 26/03* | (2006.01) | |
| *B23K 26/342* | (2014.01) | |
| *B29C 64/153* | (2017.01) | |
| *B29C 64/386* | (2017.01) | |

(52) U.S. Cl.
CPC .......... *B29C 64/268* (2017.08); *B23K 26/032* (2013.01); *B23K 26/342* (2015.10); *B29C 64/153* (2017.08); *B29C 64/386* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 5,517,420 A | * | 5/1996 | Kinsman ................ B23K 26/03 219/121.6 |
| 6,676,892 B2 | | 1/2004 | Das et al. |
| 6,995,334 B1 | | 2/2006 | Kovacevic et al. |
| 7,586,061 B2 | | 9/2009 | Hoebel et al. |
| 7,705,264 B2 | | 4/2010 | Hoebel et al. |
| 7,763,827 B2 | | 7/2010 | Papenfuss et al. |

(Continued)

OTHER PUBLICATIONS

Song, Lijun, et al., Feedback Control of Melt Pool Temperature During Laser Cladding Process, IEEE Transactions on Control Systems Technology, Nov. 2011, pp. 1349-1356, vol. 19, No. 6.

(Continued)

*Primary Examiner* — Benjamin A Schiffman
(74) *Attorney, Agent, or Firm* — John P. Darling (57) ABSTRACT

An additive manufacturing system includes a laser device, a first scanning device, and an optical system. The laser device is configured to generate a laser beam, and the first scanning device is configured to selectively direct the laser beam across a powder bed. The laser beam generates a melt pool in the powder bed. The optical system includes an optical detector configured to detect electromagnetic radiation generated by the melt pool, and a second scanning device configured to direct electromagnetic radiation generated by the melt pool to the optical detector.

18 Claims, 4 Drawing Sheets

(56) References Cited

U.S. PATENT DOCUMENTS

2007/0279639 A1* 12/2007 Hu .................... G01B 11/2441
    356/512
2012/0273472 A1   11/2012 Unrath et al.
2013/0136868 A1*  5/2013 Bruck .................... B05D 3/06
    427/554

OTHER PUBLICATIONS

Zah, M. F., et al., Modelling and simulation of electron beam melting, German Academic Society for Production Engineering, 2010, pp. 15-23, vol. 4, Issue 1.
Semak, V V, et al., Melt pool dynamics during laser welding, Journal of Physics D: Applied Physics, IOP Science, 1995, pp. 2444-2450, vol. 28, No. 12.

* cited by examiner

SYSTEMS AND METHODS FOR MONITORING A MELT POOL USING A DEDICATED SCANNING DEVICE

BACKGROUND

The field of the disclosure relates generally to additive manufacturing systems, and more particularly, to systems and methods for monitoring a melt pool in additive manufacturing systems.

At least some additive manufacturing systems involve the buildup of a powdered material to make a component. This method can produce complex components from expensive materials at a reduced cost and with improved manufacturing efficiency. At least some known additive manufacturing systems, such as Direct Metal Laser Melting (DMLM) systems, fabricate components using a laser device and a powder material, such as, without limitation, a powdered metal. The laser device generates a laser beam that melts the powder material in and around the area where the laser beam is incident on the powder material, resulting in a melt pool. In some known DMLM systems, component quality may be impacted by excess heat and/or variation in heat being transferred to the metal powder by the laser device within the melt pool.

In some known DMLM systems, component surface quality, particularly overhang or downward facing surfaces, is reduced due to the variation in conductive heat transfer between the powdered metal and the surrounding solid material of the component. As a result, local overheating may occur, particularly at the overhang surfaces. The melt pool produced by the laser device may become too large resulting in the melted metal spreading into the surrounding powdered metal as well as the melt pool penetrating deeper into the powder bed, pulling in additional powder into the melt pool. The increased melt pool size and depth, and the flow of molten metal may generally result in a poor surface finish of the overhang or downward facing surface. It is therefore desirable to monitor the melt pool during the build process for process control and development.

In some known additive manufacturing systems, such as DMLM systems, beam splitters are used to facilitate optical or infrared monitoring of the melt pool. Such beam splitters divide the laser beam from electromagnetic radiation generated by the melt pool, and thereby allow a single scanning device to scan the laser across the build surface and to reflect light generated by the melt pool to optical detectors for monitoring the melt pool. In other words, such systems allow optical detectors to "look" coaxially along the laser beam to monitor the melt pool during the manufacturing process. However, such beam splitters have reflective coatings or layers that absorb a small percentage of light from the laser beam, causing the beam splitters to heat up and undergo thermal expansion. This phenomenon, known as "thermal lensing," can cause the shape and the refractive index of the beam splitter to change, which can result in distortion of the laser beam profile, the laser beam spot size, and the melt pool image detected by the system.

As the demand for higher-throughput systems increases, higher power lasers are used to increase the build speed of additive manufacturing systems. Higher power lasers exacerbate the effects of thermal lensing, which can negatively affect the build process and the ability to accurately monitor the melt pool.

BRIEF DESCRIPTION

In one aspect, an additive manufacturing system is provided. The additive manufacturing system includes a laser device, a first scanning device, and an optical system. The laser device is configured to generate a laser beam, and the first scanning device is configured to selectively direct the laser beam across a powder bed. The laser beam generates a melt pool in the powder bed. The optical system includes an optical detector configured to detect electromagnetic radiation generated by the melt pool, and a second scanning device configured to direct electromagnetic radiation generated by the melt pool to the optical detector.

In another aspect, a method for monitoring an additive manufacturing process is provided. The method includes directing a laser beam across a powder bed using a first scanning device to generate a melt pool in the powder bed, and directing electromagnetic radiation generated by the melt pool to an optical detector using a second scanning device.

In yet another aspect, an optical system for use in an additive manufacturing system is provided. The optical system includes an optical detector configured to detect electromagnetic radiation generated by a melt pool, and a dedicated scanning device configured to direct electromagnetic radiation generated by the melt pool to the optical detector.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods as described herein facilitate enhancing the precision of additive manufacturing systems and improving the accuracy of melt pool monitoring during additive manufacturing processes. Specifically, the systems and methods described herein include an optical system having a dedicated scanning device to direct electromagnetic radiation generated by the melt pool to an optical detector to collect information about the size and temperature of the melt pool. Thus, the additive manufacturing systems described herein do not require a dichroic beam splitter to monitor the melt pool during the additive manufacturing process. By eliminating the need for a dichroic beam splitter, detrimental effects associated with thermal lensing of the beam splitter are eliminated. Further, use of a dedicated scanning device enables reflective coatings of scanning devices within the additive manufacturing system to be tailored to the type of light the scanning devices reflect. For example, the reflective coatings on mirrors used to scan a laser beam across a powder bed can be designed for a single wavelength. Such coatings are easier to manufacture and provide a higher damage threshold compared to prior systems, which required thicker reflective coatings to accommodate multiple wavelengths of light across a broad spectrum (e.g., laser wavelengths and wavelengths of light generated by the melt pool). Similarly, the reflective coatings on mirrors used to reflect EM radiation generated by the melt pool can be designed to correspond to the wavelength or range of wavelengths that an optical detector is configured to detect, thereby eliminating or reducing the detrimental effects associated with angular-dependent reflectance of such reflective coatings.

Additionally, the systems and methods described herein facilitate increasing the build speed of additive manufacturing systems by enabling the use of higher power lasers. Specifically, by eliminating the need for dichroic beam splitters, higher power laser devices may be used while avoiding detrimental processing affects associated with thermal lensing of beam splitters that may otherwise result from using such high power laser devices.

Figure 1:
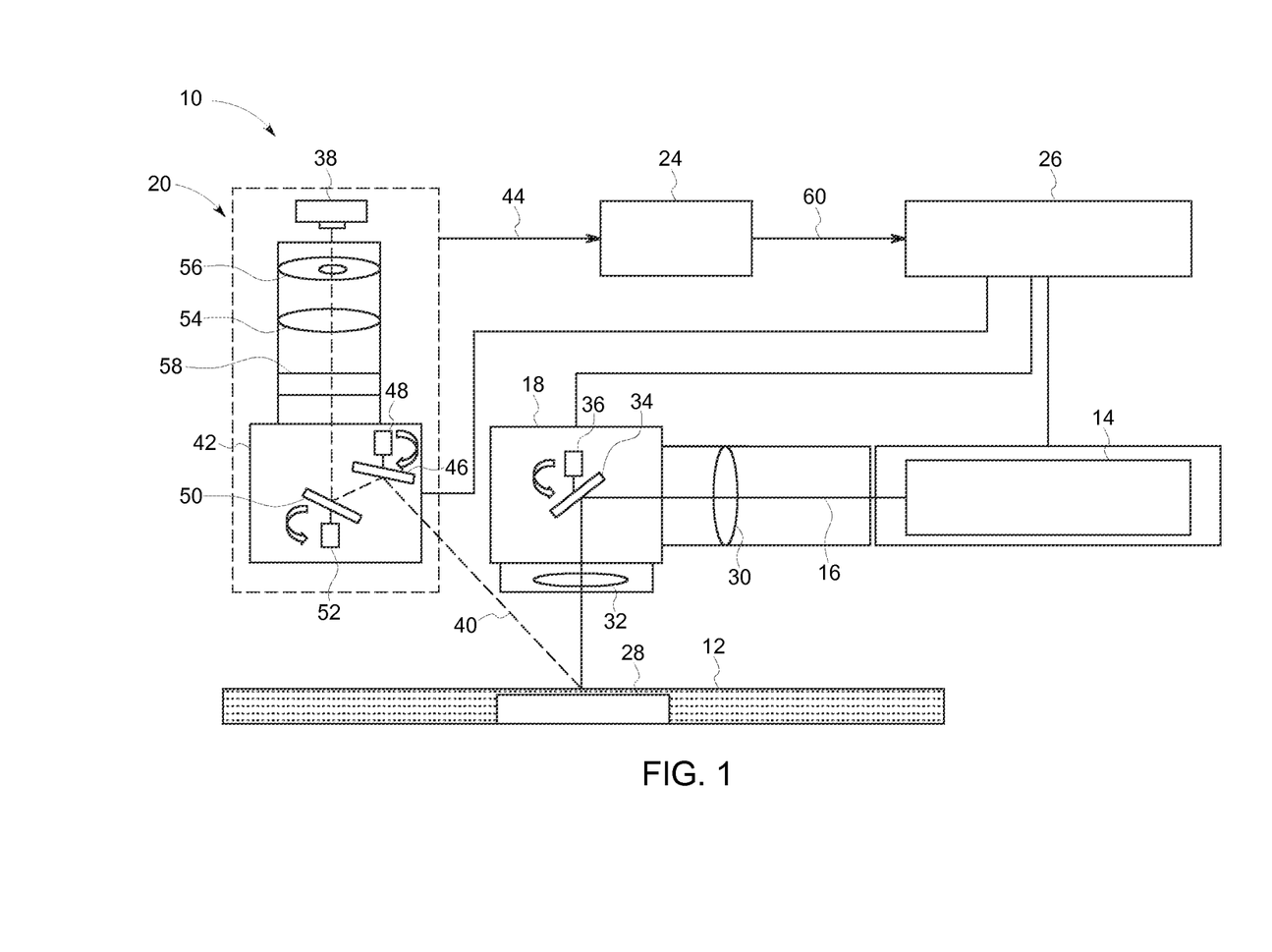
FIG. 1 is a schematic view of an exemplary additive manufacturing system shown in the form of a direct metal laser melting (DMLM) system including an optical system.

FIG. 1 is a schematic view of an exemplary additive manufacturing system 10 illustrated in the form of a direct metal laser melting (DMLM) system. Although the embodiments herein are described with reference to a DMLM system, this disclosure may also apply to other types of additive manufacturing systems, such as selective laser sintering systems.

In the exemplary embodiment, DMLM system 10 includes a powder bed 12, a laser device 14 configured to generate a laser beam 16, a first scanning device 18 configured to selectively direct laser beam 16 across powder bed 12, and an optical system 20 for monitoring a melt pool 22 (shown in FIG. 2) created by laser beam 16. The exemplary DMLM system 10 also includes a computing device 24 and a controller 26 configured to control one or more components of DMLM system 10, as described in more detail herein.

Powder bed 12 includes a powdered build material that is melted and re-solidified during the additive manufacturing process to build a solid component 28. In the exemplary embodiment, DMLM system 10 is configured to fabricate aircraft components, such as fuel nozzles. Powder bed 12 includes materials suitable for forming such components, including, without limitation, gas atomized alloys of cobalt, iron, aluminum, titanium, nickel, and combinations thereof. In other embodiments, powder bed 12 may include any suitable type of powdered metal material. In yet other embodiments, powder bed 12 may include any suitable build material that enables DMLM system 10 to function as described, including, for example and without limitation, ceramic powders, metal-coated ceramic powders, and thermoset or thermoplastic resins.

Laser device 14 is configured to generate a laser beam 16 of sufficient energy to at least partially melt the build material of powder bed 12. In the exemplary embodiment, laser device 14 is a yttrium-based solid state laser configured to emit a laser beam having a wavelength of about 1070 nanometers (nm). In other embodiments, laser device 14 may include any suitable type of laser that enables DMLM system 10 to function as described herein, such as a $CO_2$ laser. Further, although DMLM system 10 is shown and described as including a single laser device 14, DMLM system 10 may include more than one laser device. In one embodiment, for example, DMLM system 10 may include a first laser device having a first power and a second laser device having a second power different from the first laser power, or at least two laser devices having substantially the same power output. In yet other embodiments, DMLM system 10 may include any combination of laser devices that enable DMLM system 10 to function as described herein.

As shown in FIG. 1, laser device 14 is optically coupled to optical elements 30 and 32 that facilitate focusing laser beam 16 on powder bed 12. In the exemplary embodiment, optical elements 30 and 32 include a beam collimator 30 disposed between the laser device 14 and first scanning device 18, and an F-theta lens 32 disposed between the first scanning device 18 and powder bed 12. In other embodiments, DMLM system 10 may include any suitable type and arrangement of optical elements that provide a collimated and/or focused laser beam on powder bed 12.

First scanning device 18 is configured to direct laser beam 16 across selective portions of powder bed 12 to create solid component 28. In the exemplary embodiment, first scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect laser beam 16 across selective portions of powder bed 12. Mirror 34 may have any suitable configuration that enables mirror 34 to deflect laser beam 16 towards powder bed 12. In some embodiments, mirror 34 may include a reflective coating that has a reflectance spectrum that corresponds to the wavelength of laser beam 16.

Although first scanning device 18 is illustrated with a single mirror 34 and a single motor 36, first scanning device 18 may include any suitable number of mirrors and motors that enable first scanning device 18 to function as described herein. In one embodiment, for example, first scanning device 18 includes two mirrors and two galvanometer-controlled motors, each operatively coupled to one of the mirrors. In yet other embodiments, first scanning device 18 may include any suitable scanning device that enables DMLM system 10 to function as described herein, such as, for example, two-dimension (2D) scan galvanometers, three-dimension (3D) scan galvanometers, and dynamic focusing galvanometers.

Optical system 20 is configured to detect electromagnetic radiation generated by melt pool 22 and transmit information about melt pool 22 to computing device 24. In the exemplary embodiment, optical system 20 includes an optical detector 38 configured to detect electromagnetic radiation 40 (also referred to as "EM radiation") generated by melt pool 22, and a second scanning device 42 configured to direct electromagnetic radiation 40 generated by melt pool 22 to optical detector 38. Second scanning device 42 is separate from first scanning device 18, and is dedicated to directing EM radiation 40 generated by melt pool 22 to optical detector 38, rather than directing laser beam 16 towards powder bed 12. As such, second scanning device 42 is also referred to herein as a "dedicated" scanning device. In the exemplary embodiment, first scanning device 18 may also be referred to as a dedicated scanning device because it is dedicated to scanning laser beam 16 across powder bed 12 and is not used in detecting EM radiation 40 generated by melt pool 22. In other embodiments, first scanning device 18 may also be used in detecting EM radiation 40 generated by melt pool 22, and thus, may not be a dedicated scanning device. Under normal operation, optical elements within optical system 20 do not undergo thermal lensing because the EM radiation transmitted through optical system 20 has relatively low power.

Optical detector 38 is configured to detect EM radiation 40 generated by melt pool 22. More specifically, optical detector 38 is configured to receive EM radiation 40 generated by melt pool 22, and generate an electrical signal 44 in response thereto. Optical detector 38 is communicatively coupled to computing device 24, and is configured to transmit electrical signal 44 to computing device 24.

Optical detector 38 may include any suitable optical detector that enables optical system 20 to function as described herein, including, for example and without limitation, a photomultiplier tube, a photodiode, an infrared camera, a charged-couple device (CCD) camera, a CMOS camera, a pyrometer, or a high-speed visible-light camera. Although optical system 20 is shown and described as including a single optical detector 38, optical system 20 may include any suitable number and type of optical detectors that enables DMLM system 10 to function as described herein. In one embodiment, for example, optical system 20 includes a first optical detector configured to detect EM radiation within an infrared spectrum, and a second optical detector configured to detect EM radiation within a visible-light spectrum. In embodiments including more than one optical detector, optical system 20 may include a beam splitter (not shown) configured to divide and deflect EM radiation 40 from melt pool 22 to a corresponding optical detector.

While optical system 20 is described as including "optical" detectors for EM radiation 40 generated by melt pool 22, it should be noted that use of the term "optical" is not to be equated with the term "visible." Rather, optical system 20 may be configured to capture a wide spectral range of EM radiation. For example, optical detector 38 may be sensitive to light with wavelengths in the ultraviolet spectrum (about 200-400 nm), the visible spectrum (about 400-700 nm), the near-infrared spectrum (about 700-1,200 nm), and the infrared spectrum (about 1,200-10,000 nm). Further, because the type of EM radiation emitted by melt pool 22 depends on the temperature of melt pool 22, optical system 20 is capable of monitoring and measuring both a size and a temperature of melt pool 22.

Second scanning device 42 is configured to direct EM radiation 40 generated by melt pool 22 to optical detector 38. In the exemplary embodiment, second scanning device 42 is a galvanometer scanning device including a first mirror 46 operatively coupled to a first galvanometer-controlled motor 48 (broadly, an actuator), and a second mirror 50 operatively coupled to a second galvanometer-controlled motor 52 (broadly, an actuator). First motor 48 and second motor 52 are configured to move (specifically, rotate) first mirror 46 and second mirror 50, respectively, in response to signals received from controller 26 to deflect EM radiation 40 from melt pool 22 to optical detector 38. First mirror 46 and second mirror 50 may have any suitable configuration that enables first mirror 46 and second mirror 50 to deflect EM radiation 40 generated by melt pool 22. In some embodiments, one or both of first mirror 46 and second mirror 50 includes a reflective coating that has a reflectance spectrum that corresponds to EM radiation that optical detector 38 is configured to detect.

Although second scanning device 42 is illustrated and described as including two mirrors and two motors, second scanning device 42 may include any suitable number of mirrors and motors that enable optical system 20 to function as described herein. Further, second scanning device 42 may include any suitable scanning device that enables optical system 20 to function as described herein, such as, for example, two-dimension (2D) scan galvanometers, three-dimension (3D) scan galvanometers, and dynamic focusing galvanometers.

Figure 2:
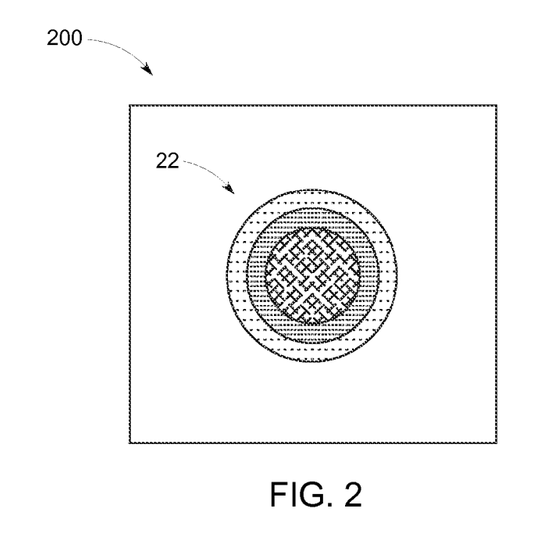
FIG. 2 is a schematic view of an observation zone of the optical system of FIG. 1.

FIG. 2 is a schematic view of an observation zone 200 of optical system 20 (shown in FIG. 1) from which optical detector 38 receives EM radiation. Observation zone 200 comprises an area of powder bed 12, which, in the illustration shown in FIG. 2, includes melt pool 22. The intensity of EM radiation 40 detected by optical detector 38 is represented by different shading densities in FIG. 2. In the exemplary embodiment, observation zone 200 has a rectangular shape. In other embodiments, observation zone 200 may have any suitable size and shape that enables DMLM system 10 to function as described herein.

Observation zone 200 is moveable along powder bed 12. More specifically, the position of observation zone 200 can be adjusted using second scanning device 42. As described in more detail herein, second scanning device 42 is operated synchronously with first scanning device 18 such that observation zone 200 tracks melt pool 22 as laser beam 16 is scanned across powder bed 12.

The size, shape, and focus of observation zone 200 may be adjusted using various optical elements. In the illustrated embodiment, for example, optical system 20 includes an objective lens 54 and a pinhole aperture device 56. Objective lens 54 is positioned between second scanning device 42 and optical detector 38. Objective lens 54 focuses EM radiation 40 generated by melt pool 22 and deflected towards optical detector 38 by second scanning device 42 onto optical detector 38. Aperture device 56 is positioned between second scanning device 42 and optical detector 38, and limits the amount of out-of-focus EM radiation from reaching optical detector 38.

The exemplary embodiment also includes an optical filter 58 positioned between second scanning device 42 and optical detector 38. Optical filter 58 may be used, for example, to filter specific portions of the EM spectrum generated by melt pool 22 to facilitate monitoring melt pool 22. Optical filter 58 may be configured to block specific wavelengths of light (e.g., wavelengths substantially similar to laser beam 16), and/or to enable specific wavelengths to pass therethrough. In the exemplary embodiment, optical filter 58 is configured to block wavelengths of EM radiation substantially similar to (e.g., within 50 nm) of the wavelength of laser beam 16.

In other embodiments, optical system 20 may include any suitable type and arrangement of optical elements that enable optical system 20 to function as described herein. In one embodiment, for example, optical system 20 includes an F-theta lens (such as F-theta lens 32) disposed between second scanning device 42 and melt pool 22.

Computing device 24 may be a computer system that includes at least one processor (not shown in FIG. 1) that executes executable instructions to operate DMLM system 10. Computing device 24 may include, for example, a calibration model of DMLM system 10 and an electronic computer build file associated with a component, such as component 28. The calibration model may include, without limitation, an expected or desired melt pool size and temperature under a given set of operating conditions (e.g., a power of laser device 14) of DMLM system 10. The build file may include build parameters that are used to control one or more components of DMLM system 10. Build parameters may include, without limitation, a power of laser device 14, a scan speed of first scanning device 18, a position and orientation of first scanning device 18 (specifically, mirror 34), a scan speed of second scanning device 42, and a position and orientation of second scanning device 42 (specifically, first mirror 46 and second mirror 50). In the exemplary embodiment, computing device 24 and controller 26 are shown as separate devices. In other embodiments, computing device 24 and controller 26 may be combined as a single device that operates as both computing device 24 and controller 26 as each are described herein.

In the exemplary embodiment, computing device 24 is also configured to operate at least partially as a data acquisition device and to monitor the operation of DMLM system 10 during fabrication of component 28. In one embodiment, for example, computing device 24 receives and processes electrical signals 44 from optical detector 38. Computing device 24 may store information associated with melt pool 22 based on electrical signals 44, which may be used to facilitate controlling and refining a build process for DMLM system 10 or for a specific component built by DMLM system 10.

Further, computing device 24 may be configured to adjust one or more build parameters in real-time based on electrical signals 44 received from optical detector 38. For example, as DMLM system 10 builds component 28, computing device 24 processes electrical signals 44 from optical detector 38 using data processing algorithms to determine the size and temperature of melt pool 22. Computing device 24 may compare the size and temperature of melt pool 22 to an expected or desired melt pool size and temperature based on a calibration model. Computing device 24 may generate control signals 60 that are fed back to controller 26 and used to adjust one or more build parameters in real-time to correct discrepancies in melt pool 22. For example, where computing device 24 detects discrepancies in melt pool 22, computing device 24 and/or controller 26 may adjust the power of laser device 14 during the build process to correct such discrepancies.

Controller 26 may include any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 may include, for example, a 3D model of component 28 to be fabricated by DMLM system 10. Executable instructions executed by controller 26 may include controlling the power output of laser device 14, controlling a position and scan speed of first scanning device 18, and controlling a position and scan speed of second scanning device 42.

Controller 26 is configured to control one or more components of DMLM system 10 based on build parameters associated with a build file stored, for example, within computing device 24. In the exemplary embodiment, controller 26 is configured to control first scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

In the exemplary embodiment, controller 26 is also configured to control second scanning device 42 to direct EM radiation 40 from melt pool 22 to optical detector 38. Controller 26 is configured to control the position, movement, and scan speed of first mirror 46 and second mirror 50 based on at least one of the position of mirror 34 of first scanning device 18 and the position of melt pool 22. In one embodiment, for example, the position of mirror 34 at a given time during the build process is determined, using computing device 24 and/or controller 26, based upon a predetermined path of a build file used to control the position of mirror 34. Controller 26 controls the position, movement, and scan speed of first mirror 46 and second mirror 50 based upon the determined position of mirror 34. In another embodiment, first scanning device 18 may be configured to communicate the position of mirror 34 to controller 26 and/or computing device 24, for example, by outputting position signals to controller 26 and/or computing device 24 that correspond to the position of mirror 34. In yet another embodiment, controller 26 controls the position, movement, and scan speed of first mirror 46 and second mirror 50 based on the position of melt pool 22. The location of melt pool 22 at a given time during the build process may be determined, for example, based upon the position of mirror 34.

Controller 26 is further configured to move second scanning device 42 synchronously with first scanning device 18 such that observation zone 200 of optical system 20 tracks the position of laser beam 16 on powder bed 12 (and thus, melt pool 22) during the additive manufacturing process.

Controller 26 may also be configured to control other components of DMLM system 10, including, without limitation, laser device 14. In one embodiment, for example, controller 26 controls the power output of laser device 14 based on build parameters associated with a build file.

Figure 3:
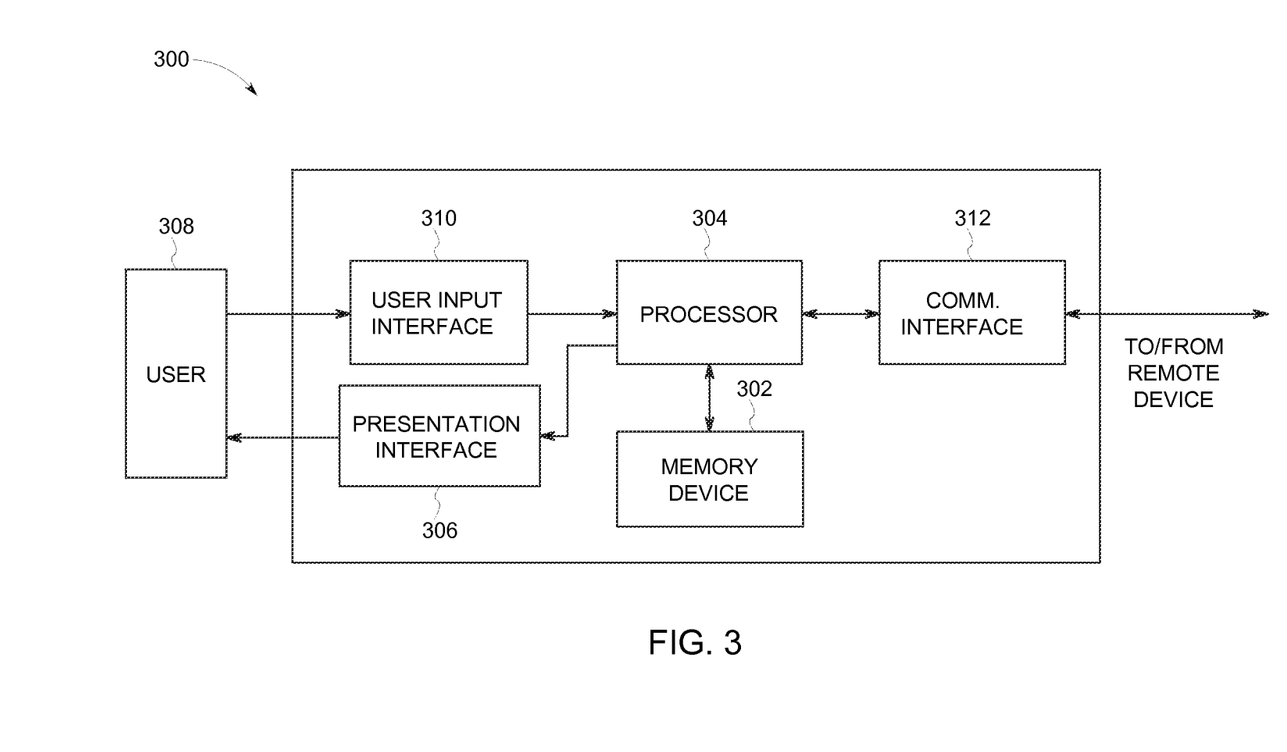
FIG. 3 is a block diagram of a computing device suitable for use in the DMLM system shown in FIG. 1.

FIG. 3 is a block diagram of a computing device 300 suitable for use in DMLM system 10, for example, as computing device 24 or as part of controller 26. In the exemplary embodiment, computing device 300 includes a memory device 302 and a processor 304 coupled to memory device 302. Processor 304 may include one or more processing units, such as, without limitation, a multi-core configuration. In the exemplary embodiment, processor 304 includes a field programmable gate array (FPGA). In other embodiments, processor 304 may include any type of processor that enables computing device 300 to function as described herein. In some embodiments, executable instructions are stored in memory device 302. Computing device 300 is configurable to perform one or more executable instructions described herein by programming processor 304. For example, processor 304 may be programmed by encoding an operation as one or more executable instructions and providing the executable instructions in memory device 302. In the exemplary embodiment, memory device 302 is one or more devices that enable storage and retrieval of information such as, without limitation, executable instructions or other data. Memory device 302 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, computing device 300 includes a presentation interface 306 coupled to processor 304. Presentation interface 306 presents information, such as, without limitation, the operating conditions of DMLM system 10, to a user 308. In one embodiment, presentation interface 306 includes a display adapter (not shown) coupled to a display device (not shown), such as, without limitation, a cathode ray tube (CRT), a liquid crystal display (LCD), an organic LED (OLED) display, or an "electronic ink" display. In some embodiments, presentation interface 306 includes one or more display devices. In addition, or alternatively, presentation interface 306 includes an audio output device (not shown), for example, without limitation, an audio adapter or a speaker (not shown).

In some embodiments, computing device 300 includes a user input interface 310. In the exemplary embodiment, user input interface 310 is coupled to processor 304 and receives input from user 308. User input interface 310 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 306 and user input interface 310.

In the exemplary embodiment, a communication interface 312 is coupled to processor 304 and is configured to be coupled in communication with one or more other devices, such as, without limitation, optical detector 38 and controller 26, and to perform input and output operations with respect to such devices while performing as an input channel. For example, communication interface 312 may include, without limitation, a wired network adapter, a wireless network adapter, a mobile telecommunications adapter, a serial communication adapter, or a parallel communication adapter. Communication interface 312 may receive a data signal from or transmit a data signal to one or more remote devices.

Presentation interface 306 and communication interface 312 are both capable of providing information suitable for use with the methods described herein, such as, without limitation, providing information to user 308 or processor 304. Accordingly, presentation interface 306 and communication interface 312 may be referred to as output devices. Similarly, user input interface 310 and communication interface 312 are capable of receiving information suitable for use with the methods described herein and may be referred to as input devices.

As noted above, second scanning device 42 is dedicated to directing EM radiation 40 generated by melt pool 22 to optical detector 38. Because DMLM system 10 includes dedicated scanning device 42 for directing EM radiation 40 from melt pool 22 to optical detector 38, the optical path of laser beam 16 from laser device 14 to powder bed 12 may be free of beam splitters, such as dichroic beam splitters. Thus, dedicated scanning device 42 eliminates detrimental processing affects associated with thermal lensing of beam splitters.

Further, dedicated scanning device 42 enables the use of high power laser devices while avoiding detrimental processing affects associated with thermal lensing of beam splitters that may otherwise result from using such high power laser devices. The use of high power laser devices facilitates increasing the build speed of additive manufacturing systems because the size and temperature of the melt pool is generally proportional to the laser beam power. By increasing the size or temperature of the melt pool, more build material can be melted and solidified by a single pass or scan of a laser beam, thereby reducing the amount of time needed to complete a build process as compared to additive manufacturing systems using lower power laser devices. Thus, in some embodiments, laser device 14 may be a relatively high power laser device, such as a laser device configured to generate a laser beam having a power of at least about 100 watts. In one embodiment, laser device 14 is configured to generate a laser beam having a power of at least approximately 200 watts and, more suitably, at least approximately 400 watts. In other embodiments, laser device 14 may be configured to generate a laser beam having a power of at least approximately 1,000 watts.

Further, because DMLM system 10 includes dedicated scanning device 42, the reflective coatings of components within first scanning device 18 and dedicated scanning device 42 may by tailored to correspond to the type of light the scanning devices reflect. Specifically, the reflective coatings used in scanning devices (such as first scanning device 18 and second scanning device 42) typically have angular-dependent reflectance spectrums. That is, the percentage of light reflected by a reflective coating varies based upon the incident angle of the reflected light. Reflective coatings may, however, have reflectance spectrums that correspond to certain wavelengths of light. That is, reflective coatings may have reflectance spectrums that are substantially angular-independent for a certain wavelength or range of wavelengths of light.

In one embodiment, for example, mirror 34 of first scanning device 18 may include a reflective coating that corresponds to the wavelength of laser beam 16. That is, the reflective coating of mirror 34 may have a reflectance spectrum where the percentage of reflected light having a wavelength of about 1070 nm is substantially the same (e.g., about 100%) regardless of the angle of incidence of the reflected light. In other words, mirror 34 may include a reflective coating having a reflectance spectrum that is substantially angular-independent for light having a wavelength of about 1070 nm. Further, in some embodiments, one or both of first mirror 46 and second mirror 50 may include a reflective coating having a reflectance spectrum that corresponds to EM radiation that optical detector 38 is configured to detect. In one embodiment, for example, first mirror 46 and second mirror 50 include a reflective coating having a reflectance spectrum that corresponds to light within the visible spectrum. In another embodiment, first mirror 46 and second mirror 50 include a reflective coating having a reflectance spectrum that corresponds to light within the infrared spectrum.

Figure 4:
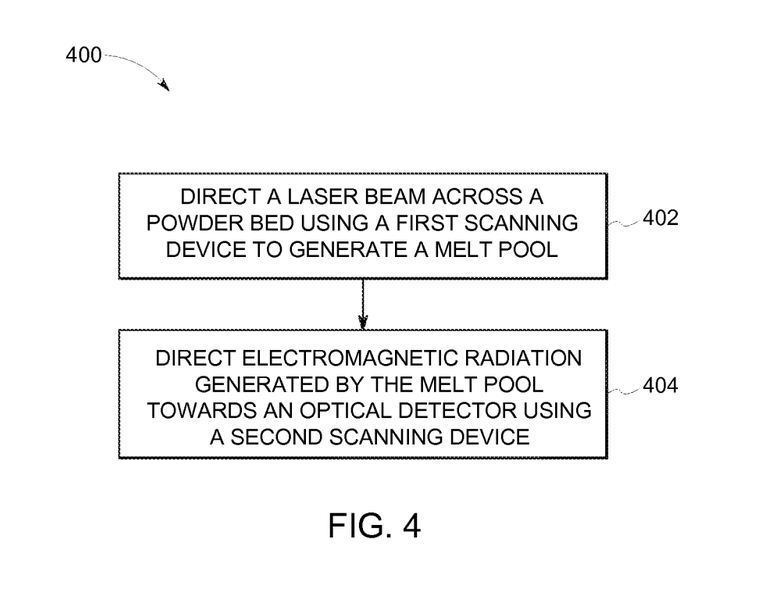
FIG. 4 is a flow chart of an exemplary method of monitoring a melt pool during an additive manufacturing process.

FIG. 4 is a flow chart of an exemplary method for monitoring an additive manufacturing process, such as a build process carried out by DMLM system 10 (shown in FIG. 1). Referring to FIGS. 1-4, in the exemplary method, laser beam 16 is directed 402 across powder bed 12 using first scanning device 18 to generate melt pool 22 in powder bed 12. First scanning device 18 may be controlled using controller 26, as described above. EM radiation 40 generated by melt pool 22 is directed 404 to optical detector 38 using second scanning device 42. Second scanning device 42 may be controlled using controller 26, as described above.

The systems and methods as described herein facilitate enhancing the precision of additive manufacturing systems and improving the accuracy of melt pool monitoring during additive manufacturing processes. Specifically, the systems and methods described herein include an optical system having a dedicated scanning device to direct electromagnetic radiation generated by the melt pool to an optical detector to collect information about the size and temperature of the melt pool. Thus, the additive manufacturing systems described herein do not require a dichroic beam splitter to monitor the melt pool during the additive manufacturing process. By eliminating the need for a dichroic beam splitter, detrimental effects associated with thermal lensing of the beam splitter are eliminated. Further, use of a dedicated scanning device enables reflective coatings of scanning devices within the additive manufacturing system to be tailored to the type of light the scanning devices reflect. For example, the reflective coatings on mirrors used to scan a laser beam across a powder bed can be designed for a single wavelength. Such coatings are easier to manufacture and provide a higher damage threshold compared to prior systems, which required thicker reflective coatings to accommodate multiple wavelengths of light across a broad spectrum (e.g., laser wavelengths and wavelengths of light generated by the melt pool). Similarly, the reflective coatings on mirrors used to reflect EM radiation generated by the melt pool can be designed to correspond to the wavelength or range of wavelengths that an optical detector is configured to detect, thereby eliminating or reducing the detrimental effects associated with angular-dependent reflectance of such reflective coatings.

Additionally, the systems and methods described herein facilitate increasing the build speed of additive manufacturing systems by enabling the use of higher power lasers. Specifically, by eliminating the need for dichroic beam splitters, higher power laser devices may be used while avoiding detrimental processing affects associated with thermal lensing of beam splitters that may otherwise result from using such high power laser devices.

An exemplary technical effect of the methods and systems described herein includes: (a) eliminating the need for a dichroic beam splitter to separate a laser beam from electromagnetic radiation generated by a melt pool; (b) improving the precision of components fabricated using additive manufacturing processes; (c) reducing the amount of post-fabrication processing needed to remove distortions from components fabricated by additive manufacturing processes; and (d) improving the accuracy of melt pool monitoring during additive manufacturing processes.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of additive manufacturing systems having a dedicated scanning device are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with aircraft components as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   a laser device configured to generate a laser beam;
   a first scanning device configured to selectively direct the laser beam across a powder bed, wherein the laser beam generates a melt pool in the powder bed; and
   an optical system comprising:
      an optical detector configured to detect electromagnetic radiation generated by the melt pool; and
      a second scanning device configured to direct electromagnetic radiation generated by the melt pool to said optical detector, wherein said second scanning device comprises at least one mirror and at least one actuator operatively coupled to said at least one mirror and said at least one mirror is a first mirror, and said first scanning device comprise a second mirror, wherein said first mirror comprises a first reflective coating having a first reflectance spectrum, and said second mirror comprises a second reflective coating having a second reflectance spectrum different from the first reflectance spectrum.

2. The system in accordance with claim 1, wherein said optical system is configured to receive electromagnetic radiation from an observation zone, said second scanning device configured to scan the observation zone across the powder bed to track the melt pool.

3. The system in accordance with claim 1 further comprising a processor coupled to said second scanning device, said processor configured to control said second scanning device synchronously with said first scanning device.

4. The system in accordance with claim 1, wherein said optical detector comprises at least one of a photomultiplier tube, a photodiode, an infrared camera, a CCD camera, a pyrometer, and a CMOS detector.

5. The system in accordance with claim 1, wherein said laser device is configured to generate a laser beam having a power of at least approximately 400 watts.

6. The system in accordance with claim 1, wherein the laser beam travels along an optical path from said laser device to the powder bed, wherein the optical path is free of dichroic beam splitters.

7. The system in accordance with claim 1, wherein the additive manufacturing system is a direct metal laser melting system.

8. The system in accordance with claim 1, wherein the optical system further comprises:
   an optical filter that blocks wavelengths of electromagnetic radiation within 50 nm of the laser beam generated by the laser device; and
   an objective lens that focuses the electromagnetic radiation generated by the melt pool on the optical detector, wherein the optical detector is configured to generate an electrical signal in response to the focused electromagnetic radiation, and the additive manufacturing system further comprises:
   a controller that includes a calibration model that includes desired melt pool sizes and temperatures corresponding to powers of the laser device, wherein the controller is configured to receive the optical signal from the optical detector and adjust at least one of a power of the laser device, a scan speed of the first scanning device, a position and an orientation of the first scanning device, a scan speed of the second scanning device, and a position and an orientation of the second scanning device to correct any discrepancy between a size and/or temperature of the melt pool and a desired melt pool size and/or temperature.

9. The system in accordance with claim 8, further comprising:
   a beam collimator between the laser device and the first scanning device that collimates the laser beam.

10. The system in accordance with claim 9, further comprising:
    an F-theta lens between the first scanning device and the powder bed.

11. The system in accordance with claim 9, wherein the optical system further comprises:
    a pin hole aperture device that reduces out-of-focus electromagnetic radiation reaching the optical detector.

12. The system in accordance with claim 8, wherein the first scanning device comprises a first motor to rotate the second mirror and the at least one actuator comprises at least one second motor to rotate the at least one mirror, and the controller is configured to control the first motor and the at least one second motor.

13. An additive manufacturing system comprising:
    a laser device configured to generate a laser beam;
    a first scanning device configured to selectively direct the laser beam across a powder bed, wherein the laser beam generates a melt pool in the powder bed; and
    an optical system comprising:
       an optical detector configured to detect electromagnetic radiation generated by the melt pool; and
       a second scanning device configured to direct electromagnetic radiation generated by the melt pool to said optical detector, wherein said second scanning device comprises at least one mirror and at least one actuator operatively coupled to said at least one mirror, wherein said at least one mirror is a first mirror, and said first scanning device comprises a second mirror, wherein said first mirror comprises a first reflective coating having a first reflectance spectrum, and said second mirror comprises a second reflective coating having a second reflectance spectrum different from the first reflectance spectrum, wherein the first reflective spectrum corresponds to a wavelength of electromagnetic radiation detectable by said optical detector, and the second reflective spectrum corresponds to a wavelength of the laser beam.

14. The system in accordance with claim 13, wherein the optical system further comprises:

an optical filter that blocks wavelengths of electromagnetic radiation within 50 nm of the laser beam generated by the laser device; and an objective lens that focuses the electromagnetic radiation generated by the melt pool on the optical detector, wherein the optical detector is configured to generate an electrical signal in response to the focused electromagnetic radiation, and the additive manufacturing system further comprises:

a controller that includes a calibration model that includes desired melt pool sizes and temperatures corresponding to powers of the laser device, wherein the controller is configured to receive the optical signal from the optical detector and adjust at least one of a power of the laser device, a scan speed of the first scanning device, a position and an orientation of the first scanning device, a scan speed of the second scanning device, and a position and an orientation of the second scanning device to correct any discrepancy between a size and/or temperature of the melt pool and a desired melt pool size and/or temperature.

15. The system in accordance with claim 14, further comprising:

a beam collimator between the laser device and the first scanning device that collimates the laser beam.

16. The system in accordance with claim 15, further comprising:

an F-theta lens between the first scanning device and the powder bed.

17. The system in accordance with claim 15, wherein the optical system further comprises:

a pin hole aperture device that reduces out-of-focus electromagnetic radiation reaching the optical detector.

18. The system in accordance with claim 14, wherein the first scanning device comprises a first motor to rotate the second mirror and the at least one actuator comprises at least one second motor to rotate the at least one mirror, and the controller is configured to control the first motor and the at least one second motor.

* * * * *